May 14, 1968     H. FRIELINGSDORF     3,382,663

MANUFACTURE OF FIBRILLATED STRANDS

Filed Dec. 14, 1965

INVENTOR:
HANS FRIELINGSDORF
BY: *Martin S. Baer*
HIS ATTORNEY

United States Patent Office 3,382,663
Patented May 14, 1968

3,382,663
MANUFACTURE OF FIBRILLATED STRANDS
Hans Frielingsdorf, Delft, Netherlands, assignor to Shell
Oil Company, New York, N.Y., a corporation of
Delaware
Filed Dec. 14, 1965, Ser. No. 513,760
Claims priority, application Netherlands, Dec. 22, 1964,
64—14,962
5 Claims. (Cl. 57—157)

ABSTRACT OF THE DISCLOSURE

Twisted fibrillated strands are produced from olefin polymers by imparting lengthwise orientation to an undrawn polyolefin film and then drawing and twisting the resulting oriented film with a tensile stress of at least 5 kg./mm.$^2$ by guided rotation through an at least substantially conical path having its apex situated substantially in the central axis of the rotation.

Figure 1:
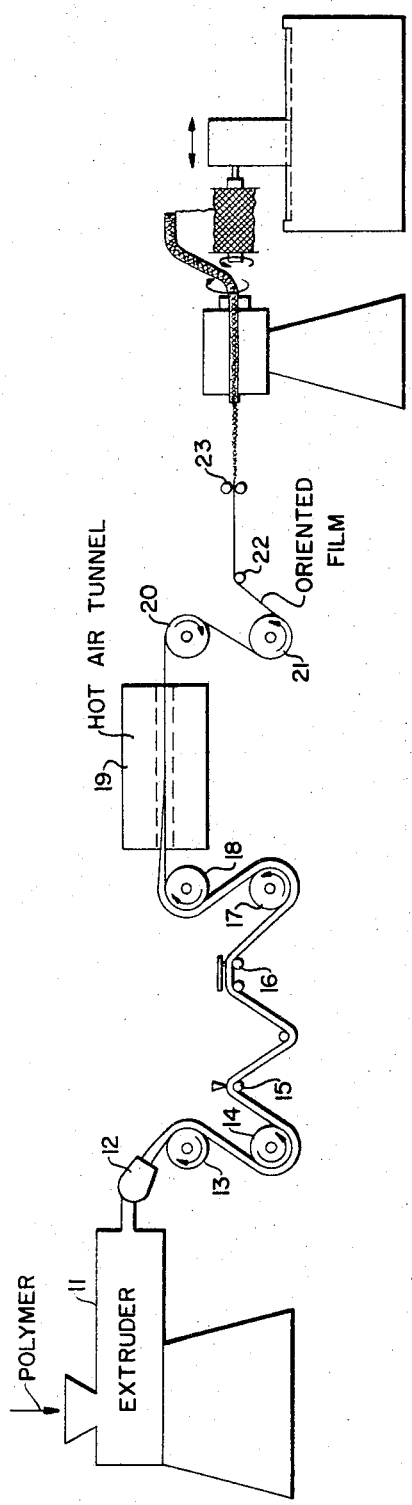

This invention relates to a method for the manufacture of twisted fibrillated strands, from molecularly oriented polyolefin films.

It is known that films of synthetic thermoplastic polymers, including polyolefins such as polyethylene, which are substantially molecularly oriented by stretching in a longitudinal direction, are readily split in the same direction. Use can be made of this property in the manufacture of products such as yarns, baler twine, strands and also fabrics with fibrous structures. According to known methods, film are molecularly oriented in a longitudinal direction and then subjected to a fibrillation treatment in which the films are divided into a large number of fibrils which may or may not be interconnected and/or coherent. Known fibrillation techniques include rubbing the film between vibrating rollers, working on the film with vibrating or rotating steel brushes, crushing the film by hammering or swaging or subjecting the film to a violent vibration caused by sound waves or gas currents blown along the film at very high speeds, for example at approximately the speed of sound. In the production of twines and yarns, the fibrillated films must be twisted in order to give the products satisfactory handling characteristics.

The method of this invention has now shown that fibrillated strands can be obtained by the much simpler method of twisting oriented polyolefin film strips without prior separate fibrillation. Moreover, the method of the invention, whereby the twisting operation is carried out under special conditions, results in an unusally homogeneous fibrillated structure since the film splits particularly uniformly.

Due to this homogeneous structure, the fibrillated products obtained during the twisting treatment according to the invention are particularly suitable for use as substitutes for sisal or hemp rope for binding bales of hay, provided that the correct number of twists per unit length is selected for the twisting operation and that films of suitable dimensions are used as starting material. It has been found that strands produced from polypropylene according to this invention have the property, essential for use as binder or baler twine, that knots made in the strand remain fast and do not slip even under substantial loading. By contrast, polypropylene monofilaments and twines made from monofilaments are slippery and do not hold knots satisfactorily under load.

The method according to the invention possesses important economic as well as technological advantages. Comparatively simple and therefore cheap equipment is sufficient for the required twisting treatment by means of which the required splitting of the film is simultaneously effected. Separate equipment for splitting the film is therefore not necessary. This economic advantage is important because the twisted products of the invention will normally be used as replacements for similar conventional products from non-synthetic materials such as hemp, cotton, sisal or jute, so that the desired replacements must be inexpensive to produce in order to compete with conventional products.

The method of this invention for the manufacture of a fibrillated polyolefin strand comprises the steps of forming a polyolefin film, orienting the film by longitudinal stretching and then simultaneously splitting and twisting it under conditions whereby the film is drawn with a tensile stress of at least 5 kg./mm.$^2$ over at least one guide point which is situated excentrally with respect to a central axis of rotation and which is rotating around this axis.

When a film is twisted under these conditions the path which the film follows while it is being twisted is at least in part conical or approximately conical, according to the degree of tension imparted to the film during twisting. The apex of this cone can be formed by the point at which the film is fed into the twisting path or by another guide point which is situated centrally or substantially centrally with respect to the central axis of rotation. The circumference of the base of the cone is thus the path of rotation of the excentrally situated guide point. The torsion axis around which the film is twisted during the twisting operation according to the invention will therefore likewise describe the conical surface over at least one part of the twisting path. The twisting causes tensile and shear stresses of varying strength to occur in the face of the film, which stresses result in a multiple splitting of the film.

It is noted that once the twisting treatment has begun it is no longer in fact a film which is passed over the guide point but the strand of fibrils obtained by splitting and twisting. As a result of the rotation of the guide point, a force will be exerted on this strand under the influence of friction, which will cause in the strand a tendency to a rolling movement. These forces also exert their influence on that part of the strand which is still in front of the guide point during the twisting operation so that they are also a factor in the splitting or fibrillation of the film.

The combined effect of the forces which cause the film to split results in a splitting which, observed in the face of the film after untwisting it, is seen to be effected in a very homogeneous manner. A large number of longitudinal slits is formed in the width of the film, dividing it into a large number of narrow strips. These strips do not vary from each other in width to any great extent, and are generally interconnected at the extremities, thus forming a coherent network.

The method of the invention excludes those twisting treatments in which the film is twisted around a torsion axis which runs through the entire twisting path in one continuous straight line. It has been found that homogeneous splitting cannot be achieved if entirely rectilinear twisting equipment is used in fibrillating the film. Instead, films fibrillated in this way, although good splitting at the outer edges, are unsatisfactorily split at the center of the film, so that strips are formed there having too great a width.

The frictional resistance which the film encounters on passing the guide point may in general be comparatively slight, since in principle no frictional forces as such are necessary to effect the desired splitting of the film. In no case may the frictional resistance be so great that the coherent structure of the network or fibrils could be disturbed as a result or that there is a risk of the stand breaking. In order to avoid too much friction in a given guide point, it is advisable to use a guide face.

It is preferable to pass the film in the twisting equipment first over a centrally or substantially centrally situated guide point before passing it over the excentrally situated guide point. The twisting operation according to the invention can thus be very suitably effected with the aid of a rotating curved tube through which the film is drawn. Such a tube will generally have a straight inlet section, a curved center portion, and a straight outlet section, as for example in a curved tube having the shape of a drawn out Z or S. In this embodiment the centrally or excentrally situated guide points are in general situated respectively at or near the end of the curved center portion of the tube, the tube wall of the straight outlet section acting as a continuous guide face. The longitudal axis of the straight inlet section of the tube thus coincides with the central axis of rotation, while the straight outlet section will normally run parallel to this axis.

During the twisting operation the film is passed into the twisting equipment through a pair of rollers and is as a rule withdrawn by means of a winding reel. By regulating the speed of rotation of the feed rollers or the winding reel it is possible to influence the tensile stress exerted on the film. This stress should be greater than 5 kg./mm.$^2$ calculated on the sectional area of the film in mm.$^2$, and is preferably at least 10 kg./mm.$^2$. The upper limit of the permissible tensile stress will in general be determined by that value at which the strand breaks, or at which a perceptible cold stretching of the resulting fibrils occurs. In this connection, moreover, temperatures are to be avoided during the twisting operation which, together with the tensile force, have a hot stretching effect on the fibrils. This could lead to an additional molecular orientation of the polymer chains in the fibrils, an occurrence which is in general undesirable. The twisting treatment will therefore normally be carried out at room temperature.

It has been found that the length of the fibrils, or in other words, the length of the split lines formed in the film, can be influenced to a certain extent by varying the tensile stress exerted. As a rule, longer split lines occur with great stresses and shorter split lines with slight tensile stresses.

The number of twists per meter to be made in the strand can of course be regulated by varying the speed with which the film or strand moves through the twisting equipment and by varying the speed of rotation of the excentrally situated guide point. In general it will not be easy during the twisting operation by means of the tube described above to achieve particularly large throughput rates, for example, larger than 100 or 200 m./min., as a result of the extremely great centrifugal forces resulting from the high tube rotation speeds required. However, high throughput rates of this nature can be achieved if in place of the curved tube at least one rotating disc is used, provided with an excentrally situated passage opening for the strand. If desired, use may be made of a number of discs placed one behind the other, the first disc, if desired, containing a centrally or substantially centrally situated passage opening. Moreover, a short tubular guide surface can also be arranged through every passage opening.

In a very suitable embodiment of the method of the invention the film may be twisted immediately after effecting the molecular orientation by longitudinal stretching, i.e., in one continuous processing step. In this case the rollers which effect the longitudinal stretching can suitably be the same ones used to pass the film into the twisting equipment. It is, however, also possible for the film to be wound onto a winding reel after the longitudinal stretching and before the twisting. This can be done, for example, when the stretching process permits greater production speeds than the twisting treatment.

As starting material for the twisting operation, use is preferably made of films which have been molecularly oriented by longitudinal stretching at stretching ratios of 6:1 or greater, suitable in the range from about 8:1 to about 13:1. Stretching is carried out at an elevated temperature. Suitable temperatures of the medium in which stretching is carried out are in the range from 100° C. to 160° C., but higher temperatures, e.g., to 200° C. and above may be employed. The temperature of the film being stretched will be about 100° C. or higher, but below the melting point which, for polypropylene, is about 160° C.

Stretching is carried out on laterally unconfined film. Both film width and film thickness are decreased by stretching. The variables of film composition, stretch ratio, feed rate, and temperature all affect the dimensions and degree of orientation of the resulting film. Optimum conditions for a given film are selected by routine trials. It has been found that the maximum useful stretching ratio is just below that at which so-called "whitening" of the film begins. As this point is exceeded, orientation decreases rather than continuing to increase, and the film is less readily split. The stretch ratio at which this is found to occur will generally be 12:1 or higher.

The width and the thickness of the molecularly oriented film which is to be split according to the method of the invention can vary within comparatively wide limits in accordance with the desired mechanical properties and the dimensions of the final twisted product. Widths of from about 2 to about 150 mm. and thicknesses from about 0.005 to about 0.25 mm. are included in the suitable ranges. Thus, for example, polypropylene films having a width of 50 to 150 mm. and a thickness of 0.02 to 0.1 mm. can be processed very satisfactorily by splitting and twisting into baler twine for bales of hay. In this case the twine will as a rule have 15 to 50, preferably 20 to 35 twists per meter, thus forming a relatively loosely wound and rather bulky strand of fibrils coherent at the ends. Strands of this type can be easily knotted by means of the conventional machines for tying bales of hay, it thus being possible to tie knots of good strength. Other polypropylene films, for example having a width of 2 to approximately 30 mm. and a thickness of 0.005 to 0.050 mm., can be processed to thin yarn-like strands; these have a greater number of twists per meter, for example 80 to 200. Strands of this type can be woven into fabrics from which "synthetic jute" sacks can suitably be manufactured. Both the thin yarn-like strands and the thicker and relatively voluminous strands consist of a great number of fibrils which in each product vary very little in width from each other. Thus, in the baler twine for bales of hay, the fibrils have in general a width of 0.5 to 0.7 mm., while the thinner yarns as a rule, contain fibrils having a width of 0.2 to 0.4 mm. These fibrils possess virtually no sharp edges, at any rate not to such an extent that trouble could be experienced in the conventional applications for baler twine or twisted yarns.

For the twisting process according to the invention, films may be used which have simply been stretched, as well as films which have been cut into several strips of lesser width after the molecular orientation by stretching. Care should, however, be taken to ensure that the film to be twisted possesses the same degree of molecular orientation over its whole width. This is particularly important when uncut films are fibrillated. A special treatment of the edges of the film, which can lead to thickened edges, is not required in the fibrillation process according to the invention.

Stereoregular polypropylene, particularly crystalline isotactic polypropylene, is the preferred polymer for use in this invention. This polymer is characterized by a content of at least 90% by weight, preferably more than 95% by weight of substances which are insoluble in boiling paraffinic hydrocarbons such as heptane or isooctane. Other highly crystalline polyolefins which can be oriented by stretching may be employed. The polyolefin may contain admixtures of other polyolefins or other polymers which do not destroy its crystalline character and ability to be oriented. Commercial polyolefins generally contain one or more additives, such an antioxidants, stabilizers against degradation due to actinic light, pigments, and the like. Polyolefins for use in this process generally will contain such additives to the extent required to give the desired properties.

It is also possible according to the invention to subject to the twisting process not one single film but a number of separate films, which, if desired, can have mutually differing physical mechanical properties.

In another modification of this invention, resulting strands are subjected to additional twisting treatment. Several strands obtained by means of the invention can be twisted into multiple strand twines or braided into cords or ropes of two or more plies.

The step of producing the unoriented film is not a part of this invention. Several methods of producing such film are known and may be employed, e.g., slit extrusion through a manifold slit die onto quench rolls; extrusion through a fishhead die into a water quench bath; blown film extrusion through an annular die; or slot casting.

Figure 2:
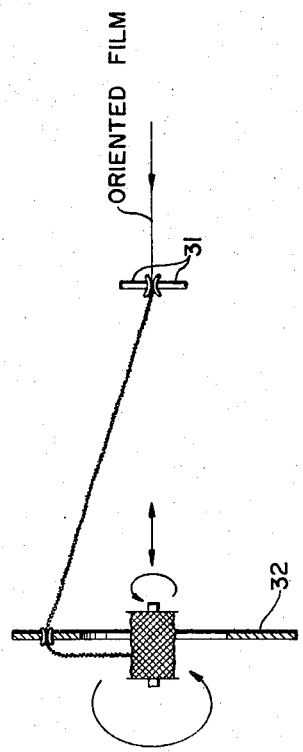

Although the film production step is not part of this invention, it is suitably integrated into the process as illustrated in the drawing, wherein:

FIGURE 1 illustrates apparatus for converting polypropylene particles such as nibs or powder into strand; and FIGURE 2 illustrates an alternative method of producing strand from the stretched film.

In FIGURE 1 polypropylene powder or nibs are charged to an extruder of a conventional type. Film is extruded through the slit die 12 onto a quench roll 13. It passes to a take-off roll 14, through an edge trimming device 15 and a gauge control 16 to feed rolls 17 and 18. These are suitably Godet rolls which can turn at a varying rate. From these the film passes through a temperature control bath, e.g., a hot air tunnel, 19 to a second pair of Godet rolls 20 and 21 which turn at a controlled higher rate, thus causing a controlled degree of stretching of the film in the hot air tunnel. From the second Godet rolls the film may be passed to a windup roll, not shown, and later processed through the remaining steps or, as illustrated, the film may pass directly over suitable guides 22 to the twisting operation in which, as illustrated, it is passed through centering roll 23 which is coaxial with the entrance to an S shaped tube which rotates at a high rate and which results in fibrillation of the film. The film is then taken up on a windup roll which has a rotational and reciprocating drive.

In the alternative method illustrated in FIGURE 2, the film passes first through a central passage in disc 31 and then through an excentrally located opening in a rotating ring or disc 32. From there it is wound up in equipment similar to FIGURE 1.

The invention is further described by means of the following examples which are illustrative and not to be considered as limiting the invention.

*Example I*

A crystalline polypropylene having a melt index of 2–4 and containing 0.2% by weight of carbon black was converted to a film by slit extrusion, followed by cooling with an internally cooled roller. Before stretching the film had a width of 240 mm. and a thickness of 0.125 mm. Stretching of the film was carried out with a stretching ratio of 12:1 at a temperature of 130° C. and a feed rate of 5 m./min. The stretched film had a width of 75 mm. and a thickness of 0.042 mm.

The film was subsequently passed into twisting equipment at a feed rate of 10 m./min. by means of a pair of feed rollers. The twist was applied by means of a rotating curved tube having a length of approximately 20 cm. and a tube diameter of approximately 12 mm. This tube had the shape of a drawn out S with a straight inlet and outlet section. The straight outlet section of the tube was excentrally situated at a distance of 5 cm. from the central axis of rotation of the tube, which axis coincided with the axis of the inlet section of the tube. The nip of the feed rollers was, in this embodiment, in exact alignment with the axis of rotation of the tube at a distance of approximately 100 cm. from the inlet opening of this tube. At the outlet of the tube the resulting product was wound onto a winding reel, the axis of which was likewise in alignment with the axis of rotation of the curved tube. The relative speed of rotation of the curved tube was such that a twine of 25 to 30 twists per meter was made in the product. The tensile stress exerted on the film during the treatment was 12 kg./mm.$^2$.

A rather loosely twisted strand was obtained having a diameter of approximately 5 mm. and consisting of a network of fibrils interconnected at the extremities. These fibrils were recognizable as narrow strips having a width of 0.5 to 0.7 mm. The twisted strand was characterized by the following properties:

Weight _____ g./m __ 2.9–3.0
Tensile strength _____ kg __ 125
Elongation at break _____ percent __ 13
Knot strength _____ kg __ 85

*Example II*

Example I was repeated using a low-pressure polyethylene having a melt index of 1.4 and a density of 0.945.

The twisted strand which was manufactured under the same conditions had the following properties:

Weight _____ g./m __ 3.1–3.2
Tensile strength _____ kg __ 90
Elongation at break _____ percent __ 19
Knot strength _____ kg __ 70

I claim as my invention:

1. A method for the manufacture of a twisted fibrillated strand from a molecularly orientable polyolefin composition, which comprises
   (a) imparting lengthwise orientation to an undrawn film web of said composition, and
   (b) twisting the resulting oriented film by guided rotation of the web under tensile stress of at least 5 kg./mm.$^2$ through an at least substantially conical path having its apex situated substantially on the central axis of the rotation.

2. A method according to claim 1 wherein:
   (a) said polyolefin is polypropylene, and
   (b) said undrawn film is oriented by stretching it
      (1) while laterally unconfined;
      (2) at a stretching ratio of at least 6:1 and below that at which whitening of the film occurs;
      (3) at a film temperature of at least about 100° C., but below the melting point of polypropylene.

3. A method according to claim 2 wherein:
   (a) said undrawn film is oriented by drawing at a temperature between 105° C. and about 160° C. at a stretch ratio in the range from 8:1 to 13:1; and
   (b) said oriented film has a width in the range from about 2 to about 150 mm. and a thickness in the range from about 0.005 to about 0.25 mm.

4. A method according to claim 3 wherein:
   (a) said oriented film is from about 50 to about 150 mm. wide and from 0.02 to 0.1 mm. thick; and
   (b) the rate of forward movement of said film and rate of rotation thereof are correlated to impart from 15 to 50 twists per meter to the resulting twisted strand.

5. A method according to claim 3 wherein:
   (a) said oriented film is from about 2 to about 30 mm. wide and from 0.005 to 0.050 mm. thick; and (b) the rate of forward movement of said film and rate of rotation thereof are correlated to impart from 80 to 200 twists per meter to the resulting twisted strand.

References Cited

UNITED STATES PATENTS

| | | | |
|---|---|---|---|
| 3,212,251 | 10/1965 | Linke et al. | 57—157 |
| 2,918,784 | 12/1959 | Faircloth | 57—167 |
| 2,920,349 | 1/1960 | White. | |
| 3,214,899 | 11/1965 | Wininger et al. | 57—140 |
| 3,277,641 | 10/1966 | O'Donahue | 57—36 XR |
| 3,293,844 | 12/1966 | Wininger et al. | 28—72 XR |

FRANK J. COHEN, *Primary Examiner.*

D. WATKINS, *Assistant Examiner.*